US012701009B2

(12) United States Patent
Seidman et al.

(10) Patent No.: US 12,701,009 B2
(45) Date of Patent: Aug. 4, 2026

(54) SYSTEMS AND METHODS FOR LOCAL ACCOUNT MANAGEMENT OF A COMPUTING RESOURCE

(71) Applicant: Workspot, Inc., Campbell, CA (US)

(72) Inventors: Edward A. Seidman, Rochester, NY (US); Anushree Kunal Pole, Sunnyvale, CA (US); Virabrahma Prasad Krothapalli, San Jose, CA (US); Amitabh Bhuvangyan Sinha, San Jose, CA (US); Jimmy Chang, Mountain View, CA (US); David T. Sulcer, Pacifica, CA (US)

(73) Assignee: WORKSPOT, INC., Campbell, CA (US)

( * ) Notice: Subject to any disclaimer, the term of this patent is extended or adjusted under 35 U.S.C. 154(b) by 76 days.

(21) Appl. No.: 18/459,817

(22) Filed: Sep. 1, 2023

(65) Prior Publication Data

US 2024/0080200 A1     Mar. 7, 2024

Related U.S. Application Data

(60) Provisional application No. 63/374,440, filed on Sep. 2, 2022.

(51) Int. Cl.
    *H04L 9/32*          (2006.01)
    *H04L 9/14*          (2006.01)
(52) U.S. Cl.
    CPC .............. *H04L 9/3226* (2013.01); *H04L 9/14* (2013.01)
(58) Field of Classification Search
    CPC .................................................. H04L 9/3226
    See application file for complete search history.

(56) References Cited

U.S. PATENT DOCUMENTS 6,446,098 B1    9/2002  Iyer et al.
6,569,208 B2    5/2003  Iyer et al.
          (Continued)

FOREIGN PATENT DOCUMENTS

CA        2384618 A1    3/2001
CA        2384730 A1    3/2001
          (Continued)

OTHER PUBLICATIONS

Australian Application No. 2002219900 filed on Nov. 28, 2001, and lapsed on Jan. 29, 2004, application based on parent publication WO 2002044949 (cited herewith).
          (Continued)

*Primary Examiner* — Simon P Kanaan
(74) *Attorney, Agent, or Firm* — NIXON PEABODY LLP

(57)               ABSTRACT

A method includes receiving, by a client, from an identity service provider, an authentication token associated with a user of the client. The method also includes receiving, by the client, from a control plane, an authorization token associated with a cloud resource. The method also includes receiving, by a desktop agent, a password request including the authentication token and the authorization token. The method also includes validating the password request based at least in part on the authentication token and the authorization token. The method also includes responsive to the validating the password request, receiving, by the client, a password for the cloud resource. The method also includes causing the client to transmit the password to the cloud resource to establish a connection between the client and the cloud resource.

20 Claims, 7 Drawing Sheets

(56) References Cited

U.S. PATENT DOCUMENTS

| | | | |
|---|---|---|---|
| 6,901,435 B1 | 5/2005 | Sulcer et al. | |
| 9,239,909 B2 | 1/2016 | Tedesco et al. | |
| 9,774,586 B1* | 9/2017 | Roche | H04L 63/08 |
| 10,504,064 B2 | 12/2019 | Rajwade et al. | |
| 11,036,554 B1* | 6/2021 | Prock | G06F 9/45558 |
| 11,223,547 B1 | 1/2022 | Chawla et al. | |
| 11,237,705 B2 | 2/2022 | Sulcer et al. | |
| 11,321,668 B2 | 5/2022 | Rajwade et al. | |
| 11,475,111 B2 | 10/2022 | Madishetti et al. | |
| 11,550,603 B2 | 1/2023 | Sulcer et al. | |
| 11,669,349 B2 | 6/2023 | Sulcer et al. | |
| 11,693,682 B2 | 7/2023 | Sulcer et al. | |
| 11,824,750 B2 | 11/2023 | Chawla et al. | |
| 12,032,431 B2 | 7/2024 | Pole et al. | |
| 12,056,509 B2 | 8/2024 | Sulcer et al. | |
| 12,293,123 B2 | 5/2025 | Seidman et al. | |
| 12,326,777 B2 | 6/2025 | Pole et al. | |
| 12,425,475 B2 | 9/2025 | Sinha et al. | |
| 12,436,816 B2 | 10/2025 | Madishetti et al. | |
| 12,461,763 B2 | 11/2025 | Madishetti et al. | |
| 2002/0093530 A1 | 7/2002 | Krothapalli et al. | |
| 2002/0095475 A1 | 7/2002 | Krothapalli et al. | |
| 2002/0116419 A1 | 8/2002 | Iyer et al. | |
| 2002/0169895 A1 | 11/2002 | Anand et al. | |
| 2002/0174099 A1 | 11/2002 | Raj et al. | |
| 2003/0037021 A1 | 2/2003 | Krothappalli et al. | |
| 2003/0074204 A1 | 4/2003 | Krothappalli et al. | |
| 2004/0205068 A1 | 10/2004 | Iyer et al. | |
| 2008/0208605 A1 | 8/2008 | Sinha et al. | |
| 2010/0061538 A1 | 3/2010 | Coleman et al. | |
| 2013/0191924 A1 | 7/2013 | Tedesco et al. | |
| 2014/0281891 A1 | 9/2014 | Sulcer et al. | |
| 2017/0053243 A1 | 2/2017 | Rajwade et al. | |
| 2018/0075231 A1* | 3/2018 | Subramanian | H04L 63/0807 |
| 2019/0306138 A1* | 10/2019 | Carru | H04L 9/3247 |
| 2020/0057995 A1 | 2/2020 | Rajwade et al. | |
| 2021/0026660 A1 | 1/2021 | Sulcer et al. | |
| 2021/0026661 A1 | 1/2021 | Sulcer et al. | |
| 2021/0026679 A1 | 1/2021 | Sulcer et al. | |
| 2021/0103644 A1 | 4/2021 | Madishetti et al. | |
| 2022/0131779 A1 | 4/2022 | Chawla et al. | |
| 2022/0334903 A1 | 10/2022 | Pole et al. | |
| 2023/0266979 A1 | 8/2023 | Madishetti et al. | |
| 2023/0359474 A1 | 11/2023 | Sulcer et al. | |
| 2023/0418634 A1 | 12/2023 | Madishetti et al. | |
| 2024/0004743 A1 | 1/2024 | Pole et al. | |
| 2024/0080200 A1 | 3/2024 | Seidman et al. | |
| 2024/0080357 A1 | 3/2024 | Pole et al. | |
| 2024/0089189 A1 | 3/2024 | Chawla et al. | |
| 2024/0095058 A1 | 3/2024 | Pole et al. | |
| 2024/0114068 A1 | 4/2024 | Sinha et al. | |
| 2024/0202044 A1 | 6/2024 | Madishetti et al. | |
| 2024/0214291 A1 | 6/2024 | Chawla et al. | |
| 2024/0231860 A1 | 7/2024 | Pole et al. | |
| 2024/0296003 A1 | 9/2024 | Seidman et al. | |
| 2024/0296006 A1 | 9/2024 | Seidman et al. | |
| 2024/0314053 A1 | 9/2024 | Chawla et al. | |
| 2024/0362098 A1 | 10/2024 | Pole et al. | |
| 2025/0030687 A1 | 1/2025 | Madishetti et al. | |
| 2025/0068532 A1 | 2/2025 | Pandit et al. | |
| 2025/0077302 A1 | 3/2025 | Pole et al. | |
| 2025/0077999 A1 | 3/2025 | Pole et al. | |
| 2025/0379880 A1 | 12/2025 | Chang et al. | |
| 2026/0032112 A1 | 1/2026 | Seidman et al. | |
| 2026/0037332 A1 | 2/2026 | Madishetti et al. | |

FOREIGN PATENT DOCUMENTS

| | | | |
|---|---|---|---|
| CN | 1379882 A | 11/2002 | |
| CN | 1461445 A | 12/2003 | |
| EP | 1210671 A2 | 6/2002 | |
| EP | 1344149 A2 | 9/2003 | |
| EP | 3133489 A1 | 2/2017 | |
| KR | 20020042831 A | 6/2002 | |
| KR | 20020043580 A | 6/2002 | |
| WO | WO 2001018679 A2 | 3/2001 | |
| WO | WO 2001018679 A3 | 3/2001 | |
| WO | WO 2001018692 A2 | 3/2001 | |
| WO | WO 2002044949 A2 | 6/2002 | |
| WO | WO 2002044949 A3 | 6/2002 | |
| WO | WO 2002044949 A9 | 6/2002 | |
| WO | WO 2002057938 A1 | 7/2002 | |
| WO | WO 2002057939 A1 | 7/2002 | |
| WO | WO 2002057940 A1 | 7/2002 | |
| WO | WO 2002057941 A1 | 7/2002 | |
| WO | WO 2002057960 A1 | 7/2002 | |
| WO | WO 2008067075 A2 | 6/2008 | |
| WO | WO 2008067075 A3 | 6/2008 | |
| WO | WO 2010030702 A1 | 3/2010 | |

OTHER PUBLICATIONS

Australian Application No. 2000073552 filed on Sep. 6, 2000, and lapsed on Jun. 16, 2005, application based on parent publication WO 2991918692 (cited herewith).

* cited by examiner

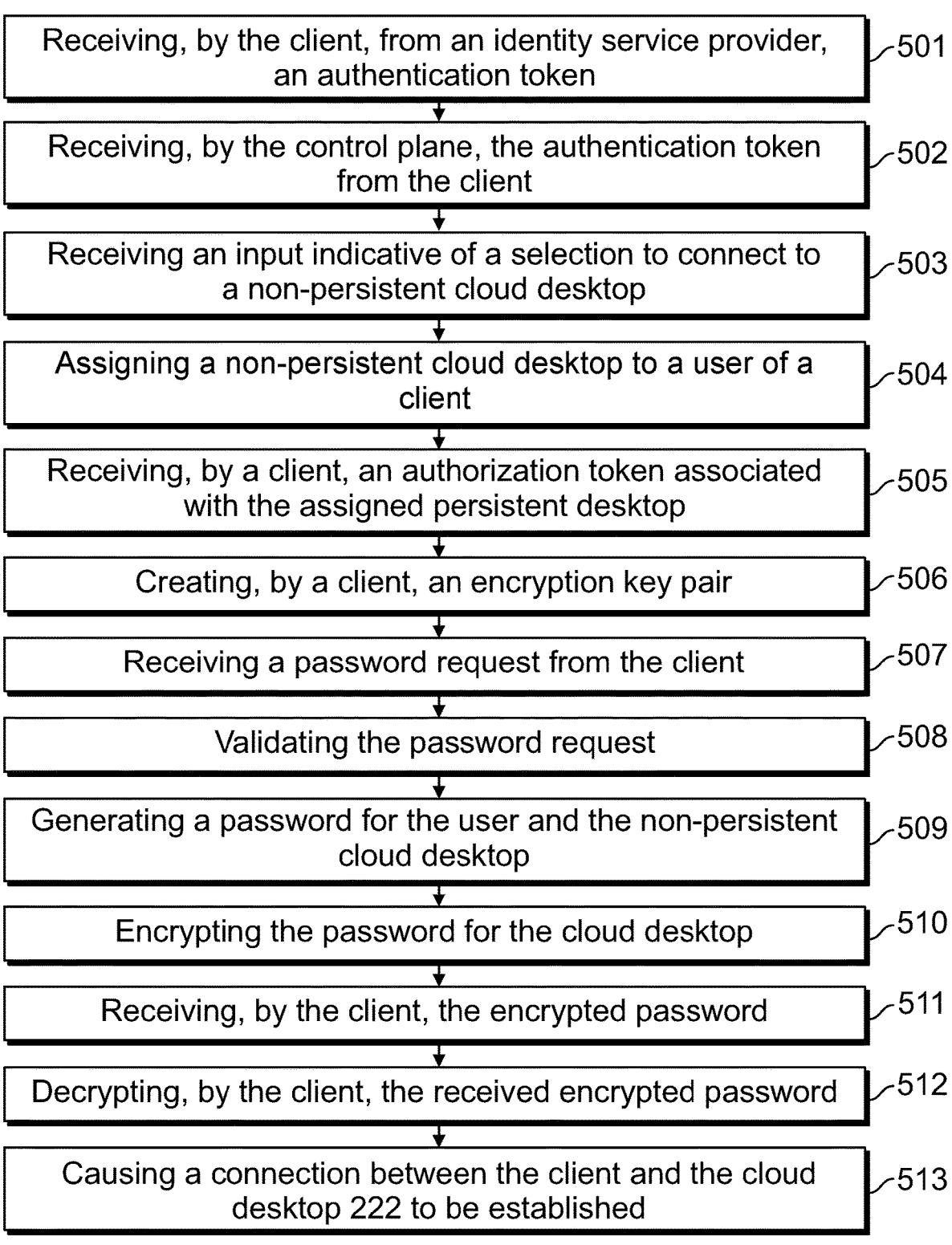

Receiving, by the client, from an identity service provider, an authentication token ⟋501

Receiving, by the control plane, the authentication token from the client ⟋502

Receiving an input indicative of a selection to connect to a non-persistent cloud desktop ⟋503

Assigning a non-persistent cloud desktop to a user of a client ⟋504

Receiving, by a client, an authorization token associated with the assigned persistent desktop ⟋505

Creating, by a client, an encryption key pair ⟋506

Receiving a password request from the client ⟋507

Validating the password request ⟋508

Generating a password for the user and the non-persistent cloud desktop ⟋509

Encrypting the password for the cloud desktop ⟋510

Receiving, by the client, the encrypted password ⟋511

Decrypting, by the client, the received encrypted password ⟋512

Causing a connection between the client and the cloud desktop 222 to be established ⟋513

FIG. 5

SYSTEMS AND METHODS FOR LOCAL ACCOUNT MANAGEMENT OF A COMPUTING RESOURCE

CROSS-REFERENCE TO RELATED APPLICATIONS

This application claims the benefit of, and priority to, U.S. Provisional Application No. 63/374,440, filed on Sep. 2, 2022, which is hereby incorporated by reference herein in its entirety.

FIELD OF THE INVENTION

The present disclosure generally relates to network-based virtual cloud resources. In particular, certain aspects of the present disclosure relate to systems and methods for connecting a client to a computing (e.g., cloud) resource using a third-party identity provider service.

BACKGROUND

Computing systems relying on applications operated by numerous networked computers are ubiquitous. Information technology (IT) service providers are tasked with effectively manage and maintain large-scale infrastructures. An example enterprise environment may have many thousands of devices and hundreds of installed software applications to support. The typical enterprise also uses many different types of central data processors, networking devices, operating systems, storage services, data backup solutions, cloud services, and other resources. These resources are often provided by means of cloud computing, which is the on-demand availability of computer system resources, such as data storage and computing power, over the public internet or other networks without direct active management by the user.

Remote desktop virtualization provides virtual desktops to network users. There is typically a capability of associating a remote desktop virtualization template in a particular cloud region with a remote desktop virtualization pool in the same cloud region as part of the general configuration model. This remote desktop virtualization template is customized with the image of the right desktop for a particular remote desktop virtualization use case.

An enterprise or organization typically has a choice of many Identity Providers (IdPs or IDPs) to manage their users and credentials. Generally, the identity provider verifies that a user is who they claim or purport to be to and may facilitate connections between cloud resources and the user. However, the cloud desktop solutions described above typically can only use a subset of these IdPs, meaning that an enterprise must use one of a limited number of supported IdPs. This requires the enterprise to procure a license or subscription to one of the supported IdPs. Requiring customers of a cloud desktop service to use one of a finite number of supported IdPs can result in the customer incurring additional costs and requires additional management overhead in terms of subscribing to and maintaining a supported directory service for their organizations. In fact, many customers do not want to join their cloud desktops to an externally-managed network domain.

Thus, a need exists for systems and methods facilitate compatibility between existing cloud desktop solutions and IdPs. The present disclosure is directed to solving these and other problems.

SUMMARY

According to some implementations of present disclosure, a method includes receiving, by a client, from an identity service provider, an authentication token associated with a user of the client. The method also includes receiving, by the client, from a control plane, an authorization token associated with a cloud resource. The method also includes receiving, by a desktop agent, a password request including the authentication token and the authorization token. The method also includes validating the password request based at least in part on the authentication token and the authorization token. The method also includes responsive to the validating the password request, receiving, by the client, a password for the cloud resource. The method also includes causing the client to transmit the password to the cloud resource to establish a connection between the client and the cloud resource.

According to some implementations of the present disclosure, a system includes a client, a control plane, and a desktop agent. The client is configured to receive, from an identity service provider, an authentication token associated with a user of the client. The client is also configured to receive from a control plane, an authorization token associated with a cloud resource. The desktop agent is configured to receive a password request including the authentication token and the authorization token. Responsive to the password request being validated, the client is configured to receive a password for the cloud resource and transmit the password to the cloud resource to establish a connection between the client and the cloud resource.

The above summary is not intended to represent each implementation or every aspect of the present disclosure. Additional features and benefits of the present disclosure are apparent from the detailed description and figures set forth below.

BRIEF DESCRIPTION OF THE DRAWINGS

The foregoing and other advantages of the invention will become apparent upon reading the following detailed description and upon reference to the drawings.

FIG. 5 is a process flow diagram for a method for connecting a client to a non-persistent cloud desktop, according to some implementations of the present disclosure;

Figure 1:
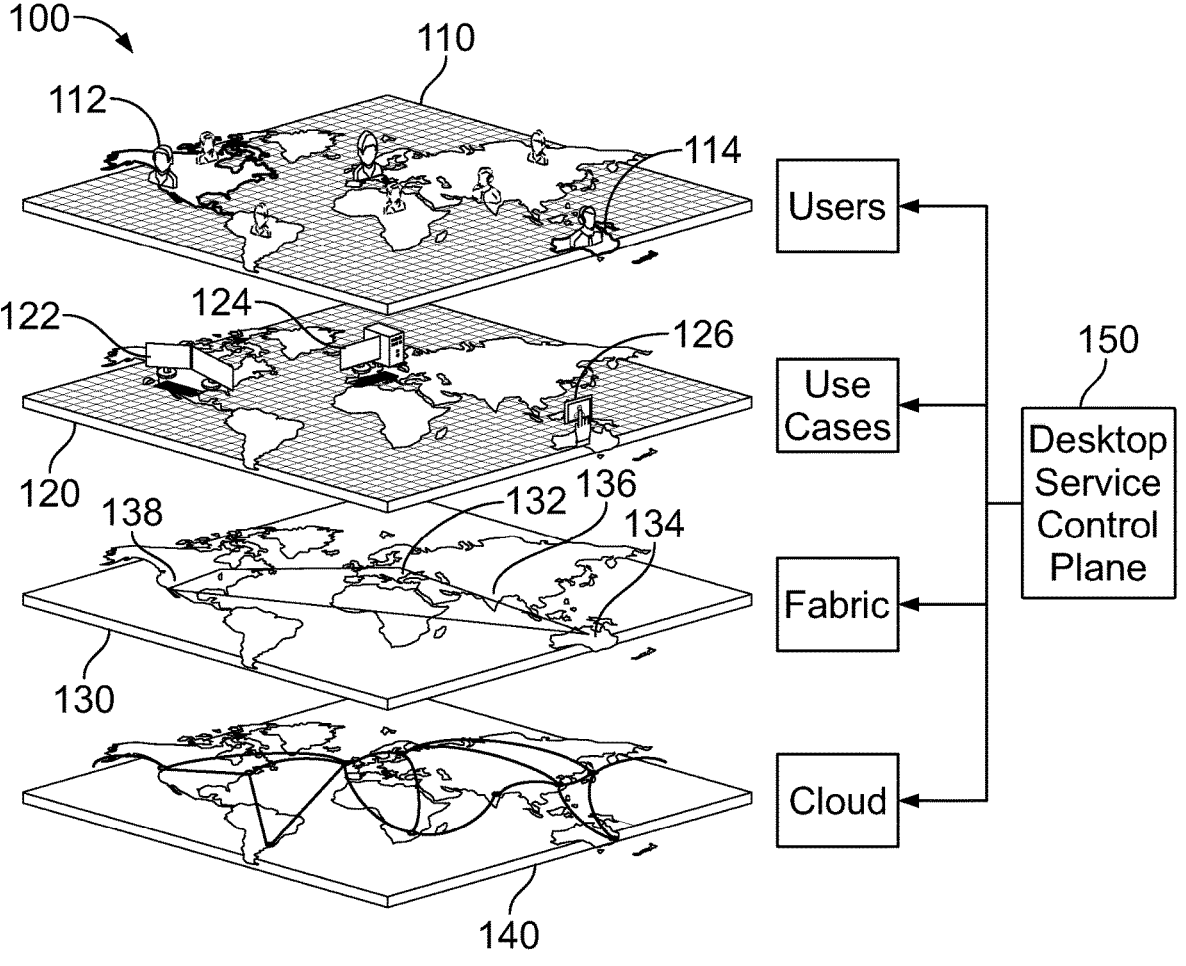
FIG. 1 is a high-level block diagram illustrating an example cloud desktop fabric allowing access to virtual desktops globally, according to some implementations of the present disclosure.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION

FIG. 1 illustrates a high-level block diagram of a cloud desktop service system 100, according to some implementations of the present disclosure. The cloud desktop service system 100 may also be referenced as a global desktop system because it provides virtual desktops for users globally. The cloud desktop service system 100 includes a users layer 110, a use cases layer 120, a fabric layer 130, and a cloud layer 140.

The users layer 110 represents desktop users having the same or similar computing needs, that may be located anywhere in the world. In this example, the users layer 110 includes users 112 and 114, who are in geographically remote locations and access desktops via computing devices (e.g., laptops, desktops, smartphones, tablets, etc.). For instance, users 112 and 114 may be employed at the same enterprise, with user 112 physically located in one geographic location (e.g., New York) and user 114 physically located in another (e.g., Los Angeles). While the users layer 110 is shown in this example as including two users, the users layer 110 can include any number of users (e.g., 20, 100, 500, 1,000, 10,000, 50,000, etc.).

The use cases layer 120 represents common logical pools of desktops available to serve the users, whereby each logical pool may be based on common desktop requirements. There can be multiple logical pools based on which groups users belong to and/or their job requirements. In this example, the pool for the users 112 and 114 may be one of a developer desktop pool 122, an engineering workstation pool 124, or a call center application pool 126. The desktops each include configuration and definitions of resources necessary to offer the desktop. Although a user accesses a single desktop, the desktop may be supported by multiple desktop resources, each supported by different cloud regions based on the requirement of the desktop in the logical pool.

For example, pools such as the developer desktop pool 122 or the engineering workstation pool 124 allow users in the pool a desktop that allows access to graphic processing unit (GPU) based applications. Other example applications may include applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Applications associated with an enterprise may include productivity applications, for example, word processing applications, search applications, document viewers, and collaboration applications. Applications associated with an enterprise may also include applications that allow communication between people, for example, email, messaging, web meetings, and so on.

The fabric layer 130 includes definitions and configurations for infrastructure and desktop service resources, including gateways, desktop templates, and others that are applied to cloud regions. The resources are maintained as cloud regions that include a data center or data centers such as cloud region 132, 134, 136, and 138. The cloud regions can be added or removed as needed.

The cloud layer 140 implements the resources defined by the use case layer 120 and fabric layer 130, including virtual desktops, infrastructure, and other virtual resources, all of which are virtual machines or other virtual resources hosted in a public or private cloud.

The layers 110, 120, 130, and 140 are created and orchestrated by a desktop service control plane 150 that can touch all the layers. The desktop service control plane 150 orchestrates the cloud desktop service system 100 in FIG. 1. The desktop service control plane 150 can manage the entire lifecycle of a desktop service implementation, from creating and managing the required desktops, to monitoring and analyzing the stream of operational data collected, enforcing security policies, and optimizing the experience for IT administrators and desktop users. For example, the desktop service control plane 150 may register a set of a virtual networks, virtual storage resources, and more. Within a virtual network, the control plane 150 may further register and coordinate the use of gateways, enterprise connectors, desktop templates, connection brokers, and more.

The two cloud desktop users 112 and 114 in different parts of the world who are each able to access an example high-performance desktop service from the cloud desktop service system 100. As will be explained below, the cloud desktop service system 100 eliminates the need to divide cloud users with similar requirements into user groups specific to a region. Rather, all users having similar needs throughout the world are considered as a single worker pool. Cloud desktop users, such as cloud desktop users 112 and 114, each may use a client device to access the desktop service. Client devices may be any device having computing and network functionality, such as a laptop computer, desktop computer, smartphone, or tablet. Client devices execute a desktop client to access remote applications such as the desktop. The client application authenticates user access to the applications. A client device can be a conventional computer system executing, for example, a Microsoft™ Windows™-compatible operating system (OS), Apple™ OS X, and/or a Linux distribution. A client device can also be a client device having computer functionality, such as a personal digital assistant (PDA), mobile telephone, tablet, video game system, etc. In this example, the client application displays an icon of the desktop or desktops available to the user. As will be explained, the desktop is made available to the user through the client application on the user device.

Figure 2:
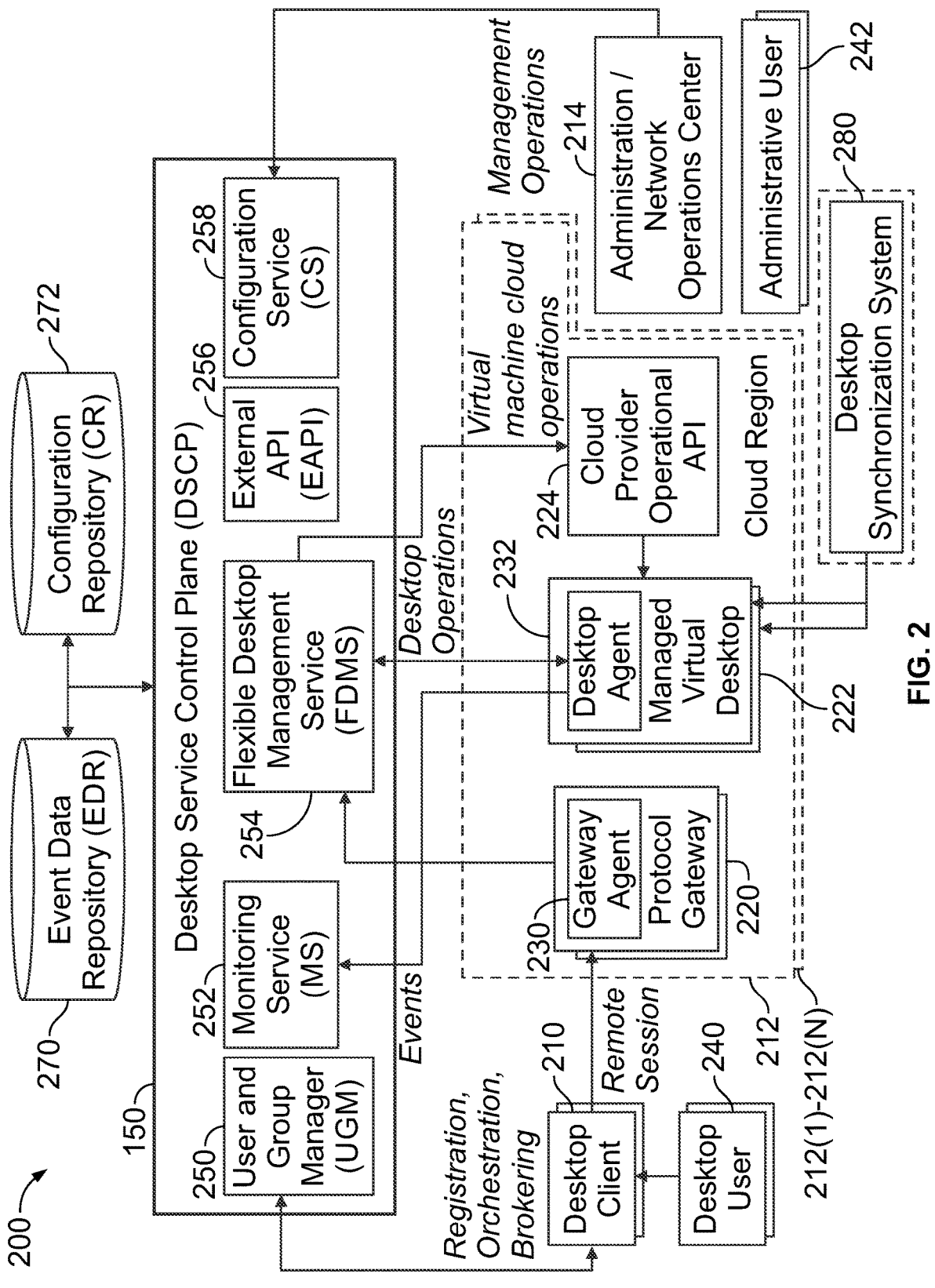
FIG. 2 is a block diagram of a cloud region and desktop service control plane of the example cloud desktop fabric in FIG. 1, according to some implementations of the present disclosure.

Referring to FIG. 2, a system 200 includes the desktop service control plane 150, a desktop client 210, a cloud region 212, and an administration center 214. The desktop client 210 is software and device hardware available in the local environment of a desktop user 240 to remotely access a managed virtual desktop (e.g., managed virtual desktop 222) using a display protocol (e.g., remote display protocol or RDP). The desktop client 210 can be installed on a standard desktop or mobile operating system, or be pre-installed on dedicated hardware devices, or downloaded dynamically via a web browser application. The desktop client 210 communicates with the desktop service control plane 150, for example, in order to be registered with the fabric, assigned a desktop, remotely configured, and for other purposes.

The cloud region 212 includes a set of protocol gateways 220, a set of managed cloud desktops 222, and a cloud service provider operational API 224, each of which can communicate with the desktop service control plane 150. The cloud region 212 includes servers that host the various applications as well as appropriate storage capabilities, such as virtual disks, memory, and network devices. Thus, the cloud region 212 typically comprises IT infrastructure that is managed by IT personnel. The IT infrastructure may include servers, network infrastructure, memory devices, software including operating systems, and so on. If there is an issue related to an application reported by a user, the IT personnel can check the health of the infrastructure used by the application. A cloud region may include a firewall to control access to the applications hosted by the cloud region. The firewall enables computing devices behind the firewall to access the applications hosted by the cloud region, but prevents computing devices outside the firewall from directly accessing the applications. The firewall may allow devices outside the firewall to access the applications within the firewall using a virtual private network (VPN). The cloud region 212 may support one of the cloud regions 132, 134, 136, and 138 in FIG. 1. While one cloud region 212 is shown in FIG. 2, more generally, the cloud desktop service system 100 can include multiple cloud regions (e.g., cloud regions 212(1) to 212(N)) similar to the cloud region 212.

The protocol gateway 220 is a desktop service resource running a service that manages secure access to a desktop supporting protocols such as a remote display protocol (RDP). The protocol gateway 220 provides secure public or internal limited access to the managed virtual desktops, that may be deployed on a virtual machine of its own. The protocol gateway 220 can be accessed as a gateway cluster, which is a set of gateways managed together for load balancing purposes.

The gateway agent 230 comprises software that is deployed on a gateway virtual machine by the desktop service control plane 150. The gateway agent monitors the activity on the gateway 220. For example, the gateway can collect error logs and/or performance metrics (e.g., regarding CPU, memory, and network utilization) and forward these to the monitoring service 252 for analysis (e.g., when requested or on a periodic or continuous basis). The gateway agent 230 can also enable the desktop service control plane 150 to assist in configuration and operations management of the gateway 220, by executing operational commands when requested to do so by the flexible desktop management service 254 such as, for example, reboot, patch installation, configuration profile update, or any combination thereof.

The managed virtual desktop 222 is provisioned and maintained by the desktop service control plane 150. A desktop template may be used to manage pools of such managed virtual desktops. The desktop template is configured to provide remote access to the desktop client 210. The desktop agent 232 is software that is deployed on the managed virtual desktop 222 by the desktop service control plane 150. The desktop agent 232 monitors the activity on the managed virtual desktop 222 and enables the desktop service control plane 150 to assist in configuration and operations management of the managed virtual desktop 222.

The cloud service provider operational application programming interface (API) 224 presents services provided by the cloud service provider that also participate in the management of the virtual machine. This can be utilized by a desktop service control plane 150 to perform operations like provisioning or de-provisioning the virtual machine.

Administrative users 242 can interact with operations reporting interface software at the administration center 214 that allows management and administration of the desktop service control plane 150.

The control plane 150 includes a user and group manager 250, a monitoring service 252, a flexible desktop management service (DMS) 254, an external API (EAPI) 256, and a configuration service (CS) 258. The control plane 150 may access an event data repository 270 and a configuration repository 272.

The user and group manager 250 maintains information about the identity of one or more authorized cloud desktop users, and optionally groups of such users, for purposes of managing the assignment to resources and specific functional capabilities. For example, administrators may associate a specific resource, such as a cloud desktop, and/or a specific functional capability, such as restricted use of that cloud desktop, with one or more specific users. Also, administrators may define a named group of cloud desktops users, and associate access to resources and functional capabilities implicitly with every member of such a group. Information about users and groups may include facts about user identity, user location, user profile, user preferences, user history, associated corporate cost center, or any other information relevant to the functioning of the control plane 150. The user and group manager 250 may assist in the self-registration experience of new users and management of existing users. The user and group manager 250 may manage this information within its own data store. Alternatively, in some implementations, the user and group manager 250 can integrate this information about users and groups with associated external entities that are managed by an external user and group management service, such as a corporate managed directory service accessed through a protocol such as Lightweight Directory Access Protocol (LDAP).

The monitoring service 252 makes both routine and error events available to administrators and can analyze operational performance and reliability. The monitoring service 252 interacts with components including the desktop client 210, desktop agent 230, gateway agent 232, and those generated by the control plane 150 itself.

The flexible desktop management service 254 interacts with the one or more managed virtual machines (MVMs) 222 in the cloud region 212 and other regional cloud regions 212(1) to 212(N). In this example, the flexible desktop management service 254 manages resources for providing virtual desktops to the users in the pools, orchestrating the lifecycle of a virtual desktop. In some implementations, the system 200 optionally includes a desktop synchronization system 280 that synchronizes the state and data available to different virtual desktops.

The administration center 214 works directly with the desktop service control plane 150 as its primary human interface. The administration center 214 allows the administrative user 242 to configure the functions of the control plane 150 through the configuration service 258. The configuration service 258 supports editing and persistence of definitions about the desktop service, including subscription information and policies. The administration center 214 may be where cloud desktop user requirements are configured by the administrative user 242.

Although only one cloud region 212 is shown in detail, it is to be understood that the desktop service control plane 150 may facilitate numerous cloud regions. The desktop service control plane 150 can perform many internal centralized functions also not depicted in in FIG. 2, including pool management, cloud service adapters, virtual desktop templates, data analysis, high-availability management, mapping users to the optimal cloud region, security policy management, monitoring, compliance, reporting, and others. Other components and services may interact with the desktop service control plane but are omitted from FIG. 2 for simplicity, such as enterprise connectors, network monitoring services, customer relationship management (CRM) systems, and many others.

An enterprise or organization typically has a choice of many Identity Providers (IdPs or IDPs) to manage their users and credentials. Generally, the identity provider verifies that a user is who they purport to be to facilities connections between cloud resources and the user. However, the cloud desktop solutions described above typically can only use a subset of these IdPs. As a result, an enterprise must use a supported IdP. Requiring customers of a cloud desktop service to use one of a finite number of supported IdPs can result in the customer incurring additional costs and requires additional management overhead in terms of subscribing to and maintaining a supported directory service for their organizations. Many customers do not want to join their cloud desktops to an externally-managed network domain. The present disclosure is directed to solving these and other problems. For example, the systems and methods described herein allow the use of a subset of IdPs to generate additional credentials by reducing the total number of IdPs required. Thus, the systems and methods described herein do not require subscriptions to a directory service for additional IdPs.

Step 301 of the method 300 includes receiving, by the client, from an identity service provider, an authentication token associated with the user of the client. The authentication token can be based on a standard such as JSON Web Token (JWT) and typically includes a payload that describes claims about the subject user within the requesting application. In some examples, the authentication token can also include information about when the token was created, and information about when the token expires and other facts relevant to authentication. The authentication token will always be digitally signed by the issuer to aid in ensuring that the issuer can be verified and that the information contained in the authentication token has not been modified.

Figure 4:
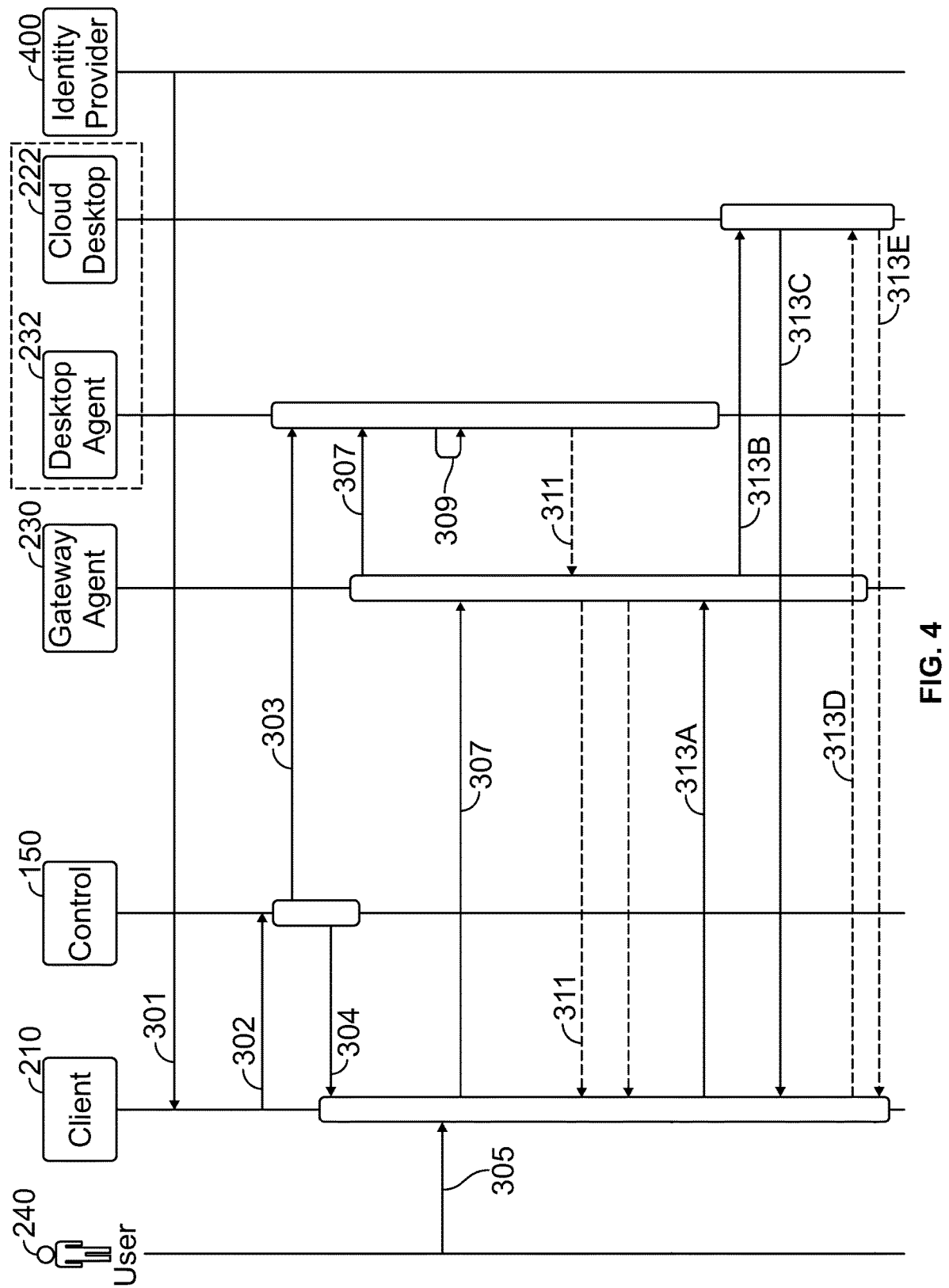
FIG. 4 is a logic diagram corresponding to the process flow diagram of FIG. 3, according to some implementations of the present disclosure.

For example, as shown in FIG. 4, the client 210 receives the authentication token from the identity service provider 400. The identity service provider 400 is a third-party service that can validate the user 240 is who they claim or purport to be. As shown in FIG. 4, the identity service provider 400 is separate and distinct from the control plane 150. The authentication token received from the identity provider (IdP) can be in, for example, an OpenID Connection (OIDC) format or a Security Assertion Markup Language (SAML) format. Example third party identity server providers include Okta, Microsoft™ Azure™ Active Directory™, Microsoft™ Active Directory™ (e.g., on-premises), Microsoft™ Active Directory™ Federation Services (ADFS), Ping, Google Identity, Google Workspace, SAML 2.0, OpenID Connect, etc. In some implementations, the authentication token is a JavaScript Object Notation (JSON) web token (JWT).

Step 302 of the method 300 includes receiving, by the control plane 150, the authentication token from the client 210. As shown in FIG. 4, the client 210 transmits the authentication token to the control plane 150 in step 302. The control plane 150 then uses the authentication token to authenticate the user (e.g., for the first time during an onboarding process). In some implementations, the control plane 150 uses one or more online validation services available from the IDP to authenticate the user. Alternatively, in other implementations, the control plane 150 uses a standard method of offline validation using the signed access token that occurs independently from the IDP.

Step 303 of the method 300 includes assigning a persistent cloud desktop to a user of the client. For example, in FIG. 4, the persistent cloud desktop 222 is assigned to the user 240 of the client 210 by the control plane 150. For example, the control plane 150 can select the persistent cloud desktop 222 from among available desktops in a pool and assign it to the user (e.g., the persistent desktop is assigned on a first come, first serve basis from what is available in the pool).

Step 304 of the method 300 includes receiving, by a client, an authorization token associated with the assigned persistent desktop. The authorization token authorizes the user of the client 210 to use the assigned persistent desktop. As shown in FIG. 4, the authorization token is transmitted by the control plane 150 and is received by the client 210. The authorization token can be stored by the client 210. As shown in FIG. 4, the client 210 receives an indication of the assigned persistent cloud desktop 222 from the control plane 150. The authorization token typically includes a unique identifier of the authorized cloud desktop, a unique identifier of the assigned user, and a digital signature created by the control plane 150. The recipient of the authorization token can therefore verify that the control plane 150 has authorized this particular user to connect to a particular desktop. Step 304 can also include the client 210 receiving address information for the assigned persistent cloud desktop 222 (e.g., host name or IP address) from the control plane 150. Once the address information is received for a persistent cloud desktop, the client 210 does not need to communicate with the control plane 150 again to obtain information needed to connect to the assigned persistent cloud desktop 222. In some implementations, the authorization token is a JavaScript Object Notation (JSON) web token (JWT).

Step 305 of the method 300 includes the client 210 creating an encryption key pair including a public key and a private key. Data encrypted with the public key can only be decrypted using the corresponding private key. The public key is made available publicly to verify the identity of the sender. The public key can include, for example, a serial number, issuer information (e.g., the name of the entity that issued the certificate), a name or other identity information associated with the user, or any combination thereof. The encryption key can be generated using a public key cryptosystem. For example, the RSA (cryptosystem) algorithm can be used to generate the public and private keys. An RSA user generates the public key, which is used to encrypt data, based on two large prime numbers that are themselves kept secret. A user that knows the secret prime numbers used is able to decrypt the data.

Step 306 of the method 300 includes receiving an input indicative of a selection to connect to the persistent cloud desktop. For example, the user 240 can launch the client 210 on their device and select a user interface element (e.g., an icon) associated with the persistent cloud desktop.

Step 307 of the method 300 includes receiving a password request from the client responsive to the input (step 305). For example, as shown in FIG. 4, the password request can first be received by the gateway agent 230 from the client 210. The password request includes the authentication token, the authorization token, the public key, the fully qualified domain name (FQDN) or internet protocol (IP)

address, and the certificate hash of the client 210. The gateway agent 230 then forwards the password request to the desktop agent 232. Cloud desktops have a unique certificate that is self-signed and self-generated. To ensure that the client is connecting to the cloud desktop that it expects to be connected to, the connection request includes a hash generated from the certificate. The hash uniquely, completely, and cryptographically identifies the cloud desktop. The hash is then validated during the connection attempt.

While step 307 is shown as in FIG. 4 including (1) transmitting the password request from the client 210 to the gateway agent 230 and then (2) transmitting the password request from the gateway agent 230 to the desktop agent 232, in other implementations, the desktop agent 232 receives the password request from the client 210 (i.e., the gateway agent 230 does not receive the password request).

Step 308 of the method 300 includes validating the password request. Specifically, the validating can include validating the authentication token and the authorization token included in the password request. The validating can include, for example, comparing a user name included in the authorization and/or authentication token to a user name associated with the assigned persistent cloud desktop. The validating can be performed, for example, using standard methods of offline validation of signed access tokens. The user name can be determined by the control plane 150 and can be based, for example, an email address associated with the user or a User Principal Name (UPN). As an example of validation, to comply with the Microsoft Windows user name conventions, the user name comprise only letters and/or numbers. Other operating systems may have different criteria for the user name. If the validating step fails, the method 300 terminates and does not proceed further. In that case, the method 300 can include transmitting a failure message to the client 210 (e.g., to prompt the user 240 and/or client 210 to try again).

As discussed above, in some implementations, the password request is first received by the gateway agent 230 from the client 210. In such implementations, step 307 can include the gateway agent 230 validating the password request before the password request is received by the desktop agent 232. Further, in such implementations, step 307 can include the desktop agent 232 validating the password request after it is received from the gateway agent 230 (e.g., the password request is first validating by the gateway agent 230 then validated again by the desktop agent 232). In some implementations, the validating is performed only by the desktop agent 230 and the gateway agent 232 does not perform the validating step.

In some implementations, the method 300 optionally includes step 309, which includes generating a password for the user and the persistent cloud desktop. The password can be generated, for example, if the user does not already have a password or one is not assigned to the user account. The generated password can be, for example, a long cryptographically random password (e.g., a password containing 64 random hexadecimal characters, at least 64 random ASCIII characters, at least 64 random alphanumeric characters, etc.). As shown in FIG. 4, the password can be generated by the desktop agent 232. In some implementations, the password is time limited (e.g., expires and no longer works after a predetermined time) or is a single-use or one-time password. In such implementations, a password is generated each time the user attempts to launch the persistent cloud desktop (step 306). The password can also be timestamped, so that, for example, the control plane 150 can determine the last time the password was changed. In some implementations, password generation by the desktop agent 232 is rate limited, for example, to inhibit brute force attacks. For example, the desktop agent 232 can be configured to generate a password at least 1 second after a request.

Step 310 of the method 300 includes encrypting the password for the cloud desktop using the private key that was received from the client 210. As shown in FIG. 4, the password is encrypted by the desktop agent 232 using the public encryption key that was received from the client 210. Alternatively, in some implementations, the password is not encrypted and is received by the client 210 in an unencrypted format.

Step 311 of the method 300 includes receiving, by the client, the encrypted password. As shown in FIG. 4, the encrypted password is transmitted by the desktop agent 232 and received by the gateway agent 230. Because the password is encrypted and the private key is not transmitted from the client 210, the actual password is not visible or accessible from the gateway agent 230. Then, the gateway 230 transmits the encrypted password so that it is received by the client 210. Alternatively, the client 210 can receive the encrypted password directly from the desktop agent 232 (e.g., without the encrypted password being sent to the gateway agent 230).

Step 312 of the method 300 includes decrypting, by the client, the received encrypted password. To decrypt the encrypted password, the client 210 uses the private key discussed above. Because the private key is required to decrypt the password, the password is only visible to the client 210. The received encrypted password can be stored on the client 210 in encrypted form or in decrypted form (e.g., the password is stored on the client 210 after the decrypting process). In some implementations, the decrypted password is stored on the client 210, and the client 210 does not need to receive the password again to connect to the persistent cloud desktop. In other implementations, the client 210 does not store the decrypted password beyond the current session (e.g., the decrypted password is no longer available after the user logs out of the client 210). In such implementations, steps 305-311 are repeated each time the client 210 attempts to connect to the persistent cloud desktop 222.

Step 313 of the method 300 includes causing a connection between the client and the cloud desktop to be established. To do so, the client 210 transmits the password to the cloud desktop 222. As described herein, the client 210 can connect to the cloud desktop 222 using a display protocol, such as Remote Desktop Protocol (RDP), FreeRDP, Citrix HDX, Citrix ICA, VMware PCoIP, etc.).

As shown in FIG. 4, in some implementations, step 313 can include sub-steps 313A-313E. In such implementations, sub-step 313A includes the gateway agent 230 receiving a logon request from the client 210. The logon request includes, for example, the authentication token. Sub-step 313B includes the cloud desktop 222 receiving a logon request from the gateway agent 230. Sub-step 313C includes the client 210 receiving request for authentication data from the cloud desktop 222. Sub-step 313D includes the cloud desktop 222 receiving the password from the client 210. Sub-step 313E includes establishing a session between the client 210 and the cloud desktop 222.

In some implementations, the method 300 further includes assigning one or more privilege levels or levels of access to the user 240. For example, the user 240 can be assigned one of a plurality of privilege levels for interacting with a cloud desktop. The plurality of privilege levels can define, for example, whether the user 240 has the privilege of installing software on the cloud desktop, whether the user 240 has the privilege of certain software on the cloud desktop (e.g., as defined using a blacklist or whitelist), whether the user 240 has the privilege to create or delete additional users, whether the user 240 has full administrative access to the cloud desktop, etc. Such privilege levels can be specified (e.g., by an administrator) using control plane 150.

Referring to FIG. 5, a method 500 for connecting a client to a cloud resource according to some implementations of the present disclosure is illustrated. The method 500 is similar to the method 300, but differs in that the cloud resource is a non-persistent cloud desktop as opposed to a persistent cloud desktop. A non-persistent desktop is a cloud desktop that is not permanently assigned to a specific user and can be allocated to a plurality of users. The method 500 can be implemented using any of the systems or devices described herein (or any combination thereof).

Figure 3:
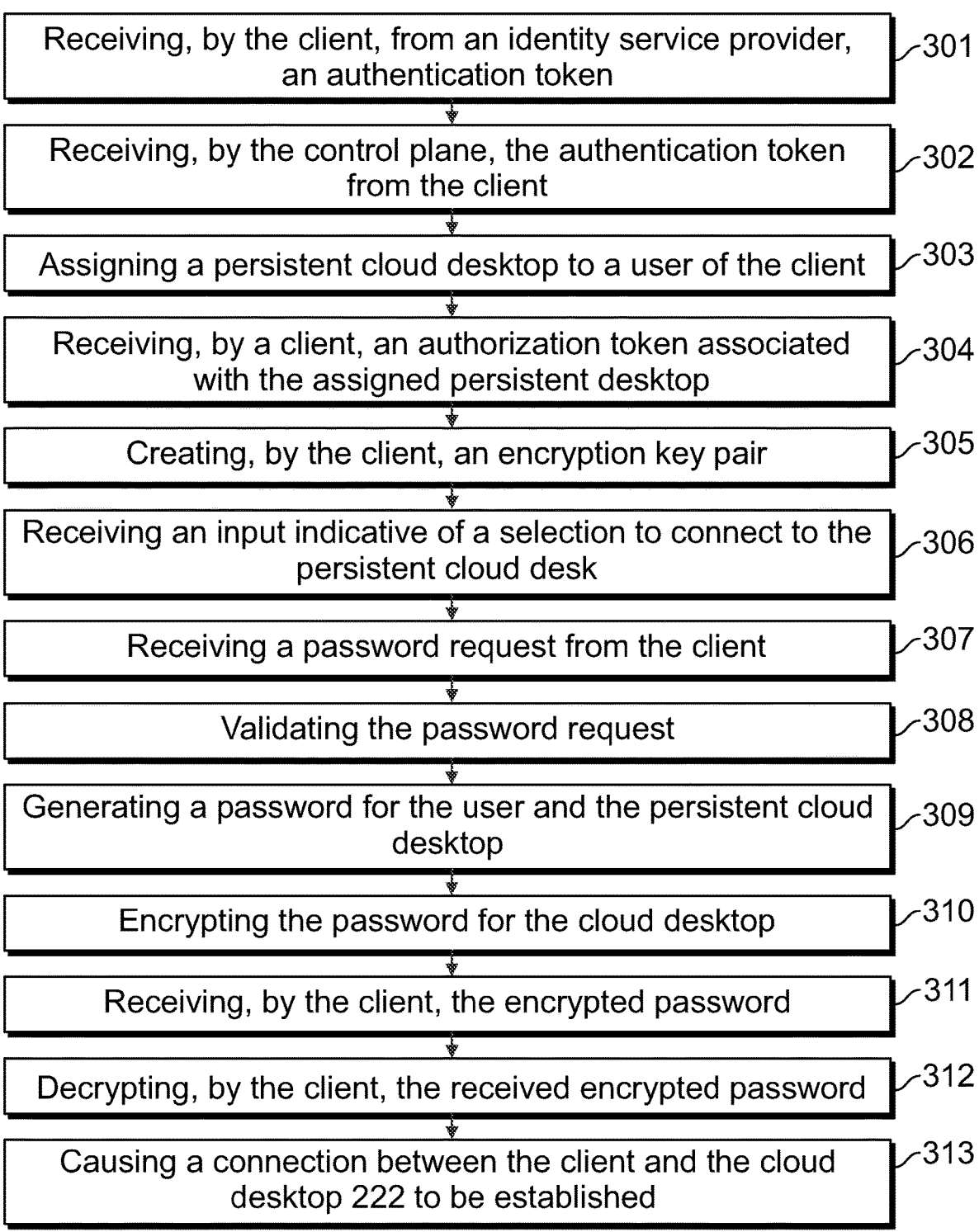
FIG. 3 is a process flow diagram for a method for connecting a client to a persistent cloud desktop, according to some implementations of the present disclosure.
Figure 6:
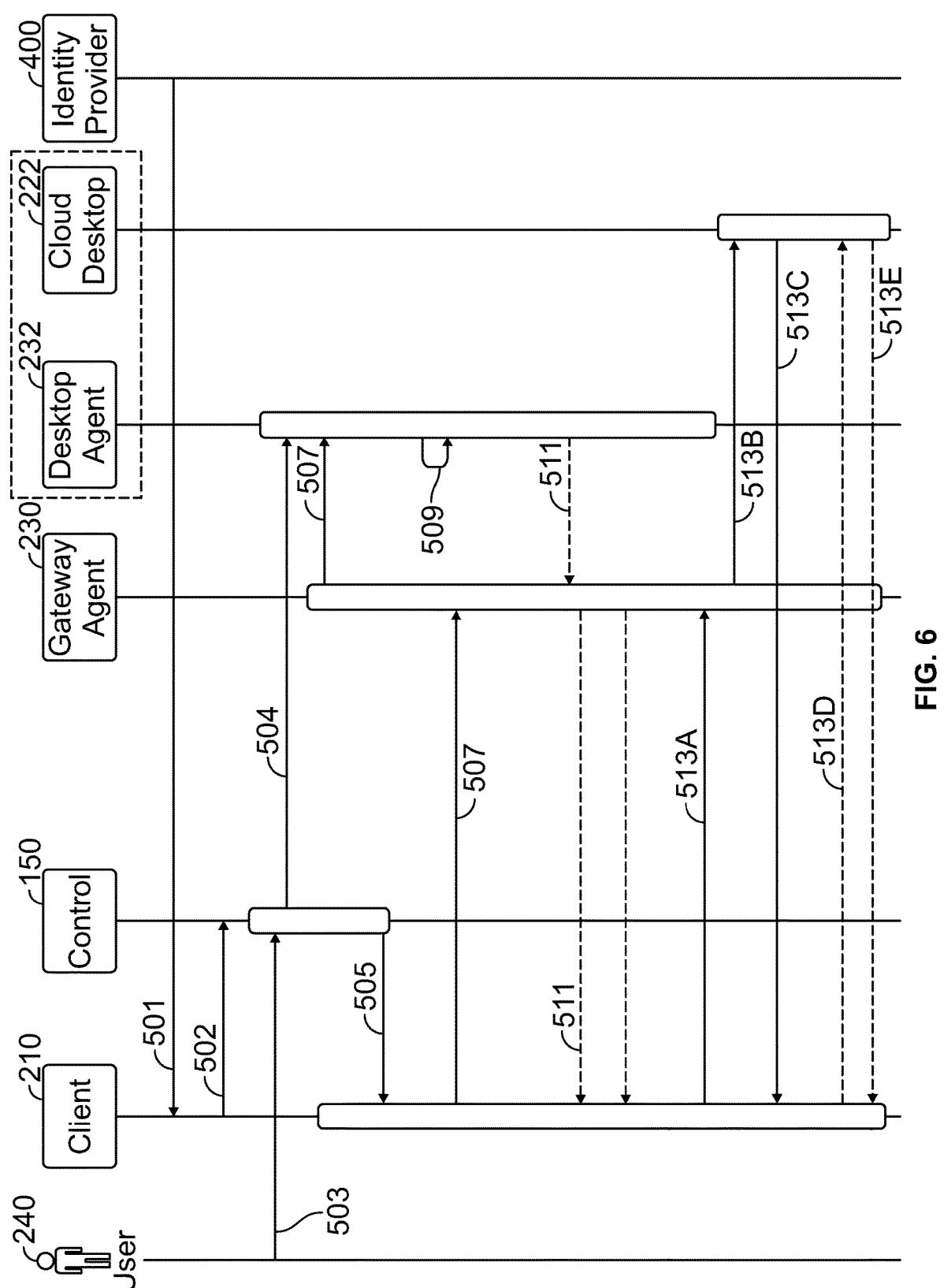
FIG. 6 is a logic diagram corresponding to the process flow diagram of FIG. 5, according to some implementations of the present disclosure.

Step 501 of the method 500 is the same as, or similar to, step 301 of the method 300 (FIG. 3) and includes receiving, by the client, from an identity service provider, an authentication token associated with the user of the client. For example, as shown in FIG. 6, the client 210 receives the authentication token from the identity service provider 200.

Step 502 of the method 500 is the same as, or similar to, step 302 of the method 300 and includes receiving, by the control plane 150, the authentication token from the client 210. As shown in FIG. 6, the client 210 transmits the authentication token to the control plane 150 in step 502. The control plane 150 then uses the authentication token to authenticate the user (e.g., for the first time during an onboarding process).

Step 503 of the method 500 is similar to step 305 of the method 300 (FIG. 3) and includes receiving an input indicative of a selection to connect to a non-persistent cloud desktop. For example, the user 240 can launch the client 210 on their device and select a user interface element (e.g., an icon) associated with the non-persistent cloud desktop. The non-persistent desktop differs from the persistent desktop in that the non-persistent desktop is not exclusively assigned to the user 240. As shown in FIG. 6, the request to connect the non-persistent desktop can be forwarded from the client 210 to the control plane 150.

Step 504 of the method 500 is similar to step 303 of the method 300 (FIG. 3) and includes assigning a non-persistent cloud desktop to a user of a client. For example, in FIG. 5, the non-persistent cloud desktop 222 can be assigned to the user 240 of the client 210 by the control plane 150. For example, the control plane 150 can select the non-persistent cloud desktop 222 from among available desktops in a pool and assign it to the user (e.g., the non-persistent desktop selected from among a plurality of non-persistent desktops available in a pool).

Figures 7, 8:
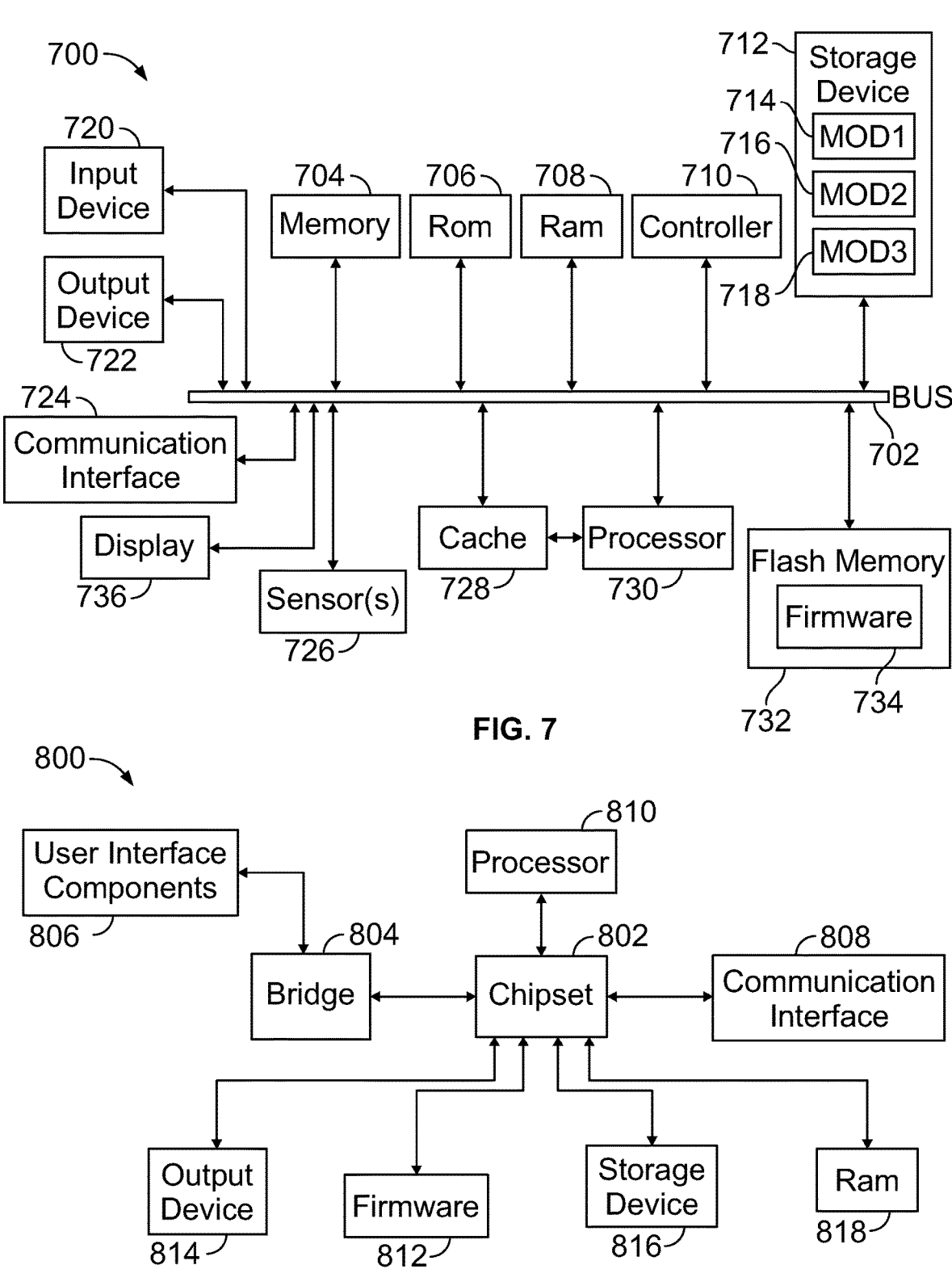
FIG. 7 illustrates a first exemplary system for implementing one or more aspects of the methods described herein, according to some implementations of the present disclosure.
FIG. 8 illustrates a second exemplary system for implementing one or more aspects of the methods described herein, according to some implementations of the present disclosure.

Step 505 of the method 500 is similar to step 304 of the method 300 (FIG. 3) and includes receiving, by a client, an authorization token associated with the assigned non-persistent desktop. The authorization token authorizes the user of the client 210 to use the assigned non-persistent desktop. As shown in FIG. 7, the authorization token is transmitted by the control plane 150 and is received by the client 210. Step 605 can also include the client 210 receiving address information for the assigned non-persistent cloud desktop 222 (e.g., host name or IP address) from the control plane 150. Unlike for a persistent desktop, the client 210 needs to communicate with the control plane 150 each time the user wants to initiate a session with a non-persistent desktop because the non-persistent desktop is not exclusively assigned to that user.

Step 506 of the method 500 is the same as step 305 of the method 300 (FIG. 3) and includes creating, by the client, an encryption key pair including a public key and a private key. Data encrypted with the public key can only be decrypted using the corresponding private key.

Step 507 of the method 500 is the same as step 307 of the method 300 (FIG. 3) and includes receiving a password request from the client. For example, as shown in FIG. 6, the password request can first be received by the gateway agent 230 from the client 210. The password request includes the authentication token, the authorization token, the public key, the fully qualified domain name (FQDN) or internet protocol (IP) address, and the certificate hash of the client 210. The gateway agent 230 then forwards the password request to the desktop agent 232. While step 607 is shown as in FIG. 6 including (1) transmitting the password request from the client 210 to the gateway agent 230 and then (2) transmitting the password request from the gateway agent 230 to the desktop agent 232, in other implementations, the desktop agent 232 can receive the password request from the client 210 (e.g., via the control plane) and the gateway agent 230 does not receive the password request. More generally, any intermediate service that cannot generate the authentication token can receive and forward the password request from the client 210.

Step 508 of the method 500 is the same as step 308 of the method 300 (FIG. 3) and includes validating the password request. Specifically, the validating can include validating the authentication token and the authorization token included in the password request. The validating can include, for example, comparing a user name included in the authorization and/or authentication token to a user name associated with the assigned persistent cloud desktop. If the validating step fails, the method 600 terminates and does not proceed further. In that case, the method 500 can include transmitting a failure message to the client 210 (e.g., to prompt the user 240 and/or client 210 to try again).

As discussed above, in some implementations, the password request is first received by the gateway agent 230 from the client 210. In such implementations, step 507 can include the gateway agent 230 validating the password request before the password request is received by the desktop agent 232. Further, in such implementations, step 507 can include the desktop agent 232 validating the password request after it is received from the gateway agent 230 (e.g., the password request is first validating by the gateway agent 230 then validated again by the desktop agent 232). In some implementations, the validating is performed only by the desktop agent 230 and the gateway agent 230 does not perform the validating step.

In some implementations, the method 500 optionally includes step 509, which is the same as step 309 of the method 300 (FIG. 3) and includes generating a password for the user and the persistent cloud desktop. The password can be generated, for example, if the user does not already have a password or one assigned to the user account. The generated password can be, for example, a long cryptographically random password (e.g., a password containing 64 random hexadecimal characters, at least 64 random ASCII characters, at least 64 random alphanumeric characters, etc.). As shown in FIG. 6, the password can be generated by the desktop agent 232. In some implementations, the password is time limited (e.g., expires and no longer works after a predetermined time) or is a single-use or one-time password. In such implementations, a password is generated each time the user attempts to launch the persistent cloud desktop (step 406). The password can also be timestamped, so that, for example, the control plane 150 can determine the last time the password was changed. In some implementations, password generation by the desktop agent 232 is rate limited, for example, to inhibit brute force attacks. For example, the desktop agent 232 can be configured to generate a password at least 1 second after a request.

Step 510 of the method 500 is the same as step 310 of the method 300 (FIG. 3) and includes encrypting the password for the cloud desktop using the private key that was received from the client 210. As shown in FIG. 6, the password is encrypted by the desktop agent 232 using the public encryption key that was received from the client 210. Alternatively, in some implementations, the password is not encrypted and is received by the client 210 in an unencrypted format.

Step 511 of the method 500 is the same as step 311 of the method 300 (FIG. 3) and includes receiving, by the client, the encrypted password. As shown in FIG. 6, the encrypted password is transmitted by the desktop agent 232 and received by the gateway agent 230. Because the password is encrypted and the private key is not transmitted from the client 210, the actual password is not visible or accessible from the gateway agent 230. Then, the gateway 230 transmits the encrypted password so that it is received by the client 210. Alternatively, the client 210 can receive the encrypted password directly from the desktop agent 232 (e.g., without the encrypted password being sent to the gateway agent 230).

Step 512 of the method 500 is the same as step 312 of the method 300 (FIG. 3) and includes decrypting, by the client, the received encrypted password. To decrypt the encrypted password, the client 210 uses the private key discussed above. Because the private key is required to decrypt the password, the password is only visible to the client 210. The received encrypted password can be stored on the client 210 in encrypted form or in decrypted form (e.g., the password is stored on the client 210 after the decrypting process). In some implementations, the decrypted password is stored on the client 210, and the client 210 does not need to receive the password again to connect to the persistent cloud desktop. In other implementations, the client 210 does not store the decrypted password beyond the current session (e.g., the decrypted password is no longer available after the user logs out of the client 210). In the case of non-persistent cloud desktops, the method 500 is repeated each time the user attempts to connect to a non-persistent cloud desktop.

Step 513 of the method 500 is the same as step 313 of the method 300 (FIG. 3) and includes causing a connection between the client 210 and the non-persistent cloud desktop 222 to be established. To do so, the client 210 transmits the password to the cloud desktop 222 and connects using one of the protocols described herein (e.g., RDP).

In some implementations of the method 300 and 500 described herein, communications are routed through the control plane 150 rather than the gateway agent 230. Using the method 300 as an example, in such implementations, step 307 includes the control plane 150 receiving the password request from the client 210 and step 311 includes transmitting the encrypted password from the desktop agent 232 to the control plane 150 (which in turn transmits the encrypted password to the client 210. In some implementations, the client 210 can receive the authentication token from the control plane 150 (e.g., the control plane 150 receives the authentication token from the identity provider 400 and transmits it to the client 210).

Generally, the cloud infrastructure where gateways, cloud desktops, and other cloud resources are provisioned to support cloud desktops is referred to as the data plane, while services running outside the data plane that orchestrate provisioning, access to, and operational support of cloud resources within the data plane is referred to the control plane or desktop service control plane (e.g., the control plane 150). In some implementations, the communications between the client 210, the gateway 230, the desktop agent 232, and the cloud desktop 222 can be referred to as residing in the data plane. In the systems and methods described herein (e.g., the methods 300 and 500), the authorization and authentication information (e.g., the password) are communicated through the data plane and are not exposed to the control plane. Thus, the administrators of the control plane cannot access a user's password because the control plane is out of the data path. To the extent the password(s) described herein are transmitted to the client 210 via the control plane 150 in some implementations, as described herein, the password can be encrypted such that the password is only accessible by the client 210 and is not accessible via the control plane 150.

The systems and methods described herein are also advantageous in that they can provide single sign on (SSO) capabilities without joining a network domain. For example, a user can log into the client once and this credential can be used to automatically log into the gateway and a cloud resource (e.g., desktop) without additional login steps. This is because the control plane 150, the gateway agent 230, and the cloud desktop 200 use the same identity service provider 400. This architecture lowers the cost of and complexity for an enterprise to use the cloud desktop services described herein.

In some implementations, it may be advantageous to change the password for the cloud resource. For instance, the user 240 may want to change the password (e.g., because they forgot their password) or an administrator may specify a policy (e.g., via the control plane 150) that the password must be changed on predetermined interval (e.g., every 3 months, every 6 months, etc.) for added security. In such cases, a password change request can be transmitted to the desktop agent 232 via the gateway agent 230. Then, similar to step 309 of the method 300 and step 509 of the method 500, the desktop agent 232 can generate a new password, such as a long cryptographically random password (e.g., a password containing 64 random hexadecimal characters, at least 64 random ASCII characters, at least 64 random alphanumeric characters, etc.). The desktop agent 232 then saves the newly generated password.

In some implementations, the user 240 may wish to connect to a cloud resource (e.g., persistent cloud desktop or non-persistent cloud desktop) from different client devices (e.g., a device at work and a device at home). As described herein, the password for the cloud resource can be saved on the client 210. In a case where the user 240 has two client devices (each with its own client application installed on it) and the password has changed, a first client may have the correct password saved while the old password is saved on the second client, meaning that the saved password on the second client will fail authentication (e.g., the user will receive a password failed error message on the second client). To address this issue, in some implementations, the methods described herein can include generating a new password as described in connection with steps 309 of the method 300 and step 509 of the method 500. In other implementations, each password that is saved by the client is timestamped, and the control plane 150 can track the last time the password was changed.

As described herein, the methods 300 and 500 are generally used to connect a client to a cloud resource from the perspective of an end user (e.g., an enterprise employee). In some implementations, the same or similar methods can be used to connect an administrator to a cloud resource that is associated with an end user. Administrators often require their own, separate mechanism to access to a cloud resource (e.g., desktop) associated with a specific end user as opposed to accessing that cloud resource using the same mechanism that the end user would use.

According to some implementations of the present disclosure, a method that is similar to the methods 300 and/or 500 described herein can allow an administrator to directly launch their own client (e.g., a web application) to access a cloud resource (e.g., persistent desktop assigned to a specific end user) using their own credentials, as opposed to the end user's credentials, to troubleshoot problems. In such implementations, the method includes receiving an authentication token from an identify service provider for the administrator in the same or similar manner described above for step 301 of the method 300 (FIG. 3) and/or step 501 of the method 500 (FIG. 5). The method also includes receiving an authorization token (e.g., from the control plane 150) for the administrator account in the same or similar manner described above for step 304 of the method 300 (FIG. 3) and/or step 504 of the method 500 (FIG. 5). The administrator can use the client 210 described herein or a web application client (e.g., that is accessed via a web browser) to connect to the cloud resource using the same or similar steps described above for method 300 (FIG. 3) and/or method 500 (FIG. 5). The administrator is typically presented with a user interface for interacting with the control plane 150. In some implementations, that user interface can include a selectable user interface element that the administrator can select to automatically connect to the cloud resource as described above.

FIGS. 7 and 8 illustrate an exemplary computing system 700, in which the components of the computing system are in electrical communication with each other using a bus 702. One or more aspects of the system 700 can be used to implement one or more aspects of the system 200 (FIG. 2) and/or the methods described herein (e.g., the method 300 and/or the method 500).

The system 700 includes a processing unit (CPU or processor) 730 and a system bus 702 that couple various system components, including the system memory 704 (e.g., read only memory (ROM) 706 and random access memory (RAM) 708), to the processor 730. The system 700 can include a cache of high-speed memory connected directly with, in close proximity to, or integrated as part of the processor 730. The system 700 can copy data from the memory 704 and/or the storage device 712 to the cache 728 for quick access by the processor 730. In this way, the cache can provide a performance boost for processor 730 while waiting for data. These and other modules can control or be configured to control the processor 730 to perform various actions. Other system memory 704 may be available for use as well. The memory 704 can include multiple different types of memory with different performance characteristics. The processor 730 can include any general purpose processor and a hardware module or software module, such as module 1 714, module 2 716, and module 3 717 embedded in storage device 712. The hardware module or software module is configured to control the processor 730, as well as a special-purpose processor where software instructions are incorporated into the actual processor design. The processor 730 may essentially be a completely self-contained computing system that contains multiple cores or processors, a bus, memory controller, cache, etc. A multi-core processor may be symmetric or asymmetric.

To enable user interaction with the computing device 700, an input device 720 is provided as an input mechanism. The input device 720 can comprise a microphone for speech, a touch-sensitive screen for gesture or graphical input, keyboard, mouse, motion input, and so forth. In some instances, multimodal systems can enable a user to provide multiple types of input to communicate with the system 700. In this example, an output device 722 is also provided. The communications interface 724 can govern and manage the user input and system output.

Storage device 712 can be a non-volatile memory to store data that is accessible by a computer. The storage device 712 can be magnetic cassettes, flash memory cards, solid state memory devices, digital versatile disks, cartridges, random access memories (RAMs) 707, read only memory (ROM) 706, and hybrids thereof.

The controller 710 can be a specialized microcontroller or processor on the system 700, such as a BMC (baseboard management controller). In some cases, the controller 710 can be part of an Intelligent Platform Management Interface (IPMI). Moreover, in some cases, the controller 710 can be embedded on a motherboard or main circuit board of the system 700. The controller 710 can manage the interface between system management software and platform hardware. The controller 710 can also communicate with various system devices and components (internal and/or external), such as controllers or peripheral components, as further described below.

The controller 710 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 710 to initiate or conduct specific hardware recovery procedures or operations, as further described below.

The controller 710 can also include a system event log controller and/or storage for managing and maintaining events, alerts, and notifications received by the controller 710. For example, the controller 710 or a system event log controller can receive alerts or notifications from one or more devices and components, and maintain the alerts or notifications in a system event log storage component.

Flash memory 732 can be an electronic non-volatile computer storage medium or chip that can be used by the system 700 for storage and/or data transfer. The flash memory 732 can be electrically erased and/or reprogrammed. Flash memory 732 can include EPROM (erasable programmable read-only memory), EEPROM (electrically erasable programmable read-only memory), ROM, NVRAM, or CMOS (complementary metal-oxide semiconductor), for example. The flash memory 732 can store the firmware 734 executed by the system 700 when the system 600 is first powered on, along with a set of configurations specified for the firmware 734. The flash memory 732 can also store configurations used by the firmware 734.

The firmware 734 can include a Basic Input/Output System or equivalents, such as an EFI (Extensible Firmware Interface) or UEFI (Unified Extensible Firmware Interface). The firmware 734 can be loaded and executed as a sequence program each time the system 700 is started. The firmware 734 can recognize, initialize, and test hardware present in the system 600 based on the set of configurations. The firmware 734 can perform a self-test, such as a POST (Power-On-Self-Test), on the system 700. This self-test can test the functionality of various hardware components such as hard disk drives, optical reading devices, cooling devices, memory modules, expansion cards, and the like. The firmware 734 can address and allocate an area in the memory 704, ROM 706, RAM 707, and/or storage device 712, to store an operating system (OS). The firmware 734 can load a boot loader and/or OS, and give control of the system 700 to the OS.

The firmware 734 of the system 700 can include a firmware configuration that defines how the firmware 734 controls various hardware components in the system 700. The firmware configuration can determine the order in which the various hardware components in the system 700 are started. The firmware 734 can provide an interface, such as an UEFI, that allows a variety of different parameters to be set, which can be different from parameters in a firmware default configuration. For example, a user (e.g., an administrator) can use the firmware 734 to specify clock and bus speeds, define what peripherals are attached to the system 700, set monitoring of health (e.g., fan speeds and CPU temperature limits), and/or provide a variety of other parameters that affect overall performance and power usage of the system 700. While firmware 734 is illustrated as being stored in the flash memory 732, one of ordinary skill in the art will readily recognize that the firmware 734 can be stored in other memory components, such as memory 704 or ROM 706.

System 700 can include one or more sensors 726. The one or more sensors 726 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 726 can communicate with the processor, cache 727, flash memory 732, communications interface 724, memory 704, ROM 706, RAM 707, controller 710, and storage device 712, via the bus 702, for example. The one or more sensors 726 can also communicate with other components in the system via one or more different means, such as inter-integrated circuit (I2C), general purpose output (GPO), and the like. Different types of sensors (e.g., sensors 726) on the system 700 can also report to the controller 710 on parameters, such as cooling fan speeds, power status, operating system (OS) status, hardware status, and so forth. A display 736 may be used by the system 700 to provide graphics related to the applications that are executed by the controller 710.

FIG. 8 illustrates an example computer system 800 having a chipset architecture that can be used in executing the described method(s) or operations, and generating and displaying a graphical user interface (GUI). Computer system 800 can include computer hardware, software, and firmware that can be used to implement the disclosed technology. System 800 can include a processor 810, representative of a variety of physically and/or logically distinct resources capable of executing software, firmware, and hardware configured to perform identified computations. Processor 810 can communicate with a chipset 802 that can control input to and output from processor 810. In this example, chipset 802 outputs information to output device 814, such as a display, and can read and write information to storage device 816. The storage device 816 can include magnetic media, and solid state media, for example. Chipset 802 can also read data from and write data to RAM 817. A bridge 804 for interfacing with a variety of user interface components 806, can be provided for interfacing with chipset 802. User interface components 806 can include a keyboard, a microphone, touch detection, and processing circuitry, and a pointing device, such as a mouse.

Chipset 802 can also interface with one or more communication interfaces 807 that can have different physical interfaces. Such communication interfaces can include interfaces for wired and wireless local area networks, for broadband wireless networks, and for personal area networks. Further, the machine can receive inputs from a user via user interface components 806, and execute appropriate functions, such as browsing functions by interpreting these inputs using processor 810.

Moreover, chipset 802 can also communicate with firmware 812, which can be executed by the computer system 800 when powering on. The firmware 812 can recognize, initialize, and test hardware present in the computer system 800 based on a set of firmware configurations. The firmware 812 can perform a self-test, such as a POST, on the system 800. The self-test can test the functionality of the various hardware components 802-817. The firmware 812 can address and allocate an area in the memory 817 to store an OS. The firmware 812 can load a boot loader and/or OS, and give control of the system 800 to the OS. In some cases, the firmware 812 can communicate with the hardware components 802-810 and 814-817. Here, the firmware 812 can communicate with the hardware components 802-810 and 814-817 through the chipset 802, and/or through one or more other components. In some cases, the firmware 812 can communicate directly with the hardware components 802-810 and 814-817.

It can be appreciated that example systems 700 (in FIG. 7) and 800 can have more than one processor (e.g., 730, 810), or be part of a group or cluster of computing devices networked together to provide greater processing capability.

The terms component, module, system, or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a device can come in the form of specially designed hardware, generalized hardware made specialized by the execution of software thereon that enables the hardware to perform specific function, software stored on a computer-readable medium, or a combination thereof.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A method comprising:

receiving, by a client, from an identity service provider, an authentication token associated with a user of the client;

receiving, by the client, from a control plane executed by a processor, an authorization token associated with a cloud resource;

receiving, by a desktop agent executed by a server, a password request including the authentication token and the authorization token;

validating the password request based at least in part on the authentication token and the authorization token;

responsive to the validating the password request, receiving, by the client, a password for the cloud resource; and causing the client to transmit the password to the cloud resource to establish a connection between the client and the cloud resource.

2. The method of claim 1, further comprising:

responsive to the validating the password request, encrypting, by the desktop agent, the password for the cloud resource such that the password is encrypted when received by the client; and decrypting, by the client, the received encrypted password.

3. The method of claim 2, further comprising generating, by the client, an encryption pair including a private encryption key and a public encryption key, and wherein the password request includes the public encryption key.

4. The method of claim 3, wherein the encrypting the password is based at least part on the public encryption key and the decrypting the password is based at least in part on the private encryption key.

5. The method of claim 1, wherein the receiving, by the desktop agent, the password request includes (i) the gateway agent receiving the password request from the client and (ii) the desktop agent receiving the password request from the gateway agent.

6. The method of claim 5, wherein the validating the desktop password request includes (i) the gateway agent validating the authentication token and the authorization token received from the client, (ii) the desktop agent validating the authentication token and the authorization token received from the gateway agent, or both (i) and (ii).

7. The method of claim 6, wherein the receiving the password for the cloud resource by the client includes (i) the gateway agent receiving the password from the desktop agent and (ii) the client receiving the password from the gateway agent.

8. The method of claim 1, further comprising:

transmitting, by the client, the authentication token to the control plane; and authenticating, by the control plane, the user of the client based on the authentication token;

wherein the receiving authorization token by the client from the control plane is responsive to the authenticating the user of the client by the control plane.

9. The method of claim 8, wherein the cloud resource is a non-persistent desktop.

10. The method of claim 9, further comprising:

subsequent to the receiving the authorization token, receiving, by the client, an input indicative of a selection by the user to initiate a desktop session; and responsive to the input indicative of the selection by the user to initiate the desktop session, assigning, by the control plane, the non-persistent desktop to the user;

wherein the receiving authorization token by the client from the control plane is responsive to assigning the non-persistent cloud desktop to the user.

11. The method of claim 7, wherein the cloud resource is a persistent virtual desktop.

12. The method of claim 11, further comprising assigning the persistent cloud desktop to the user responsive to the control plane authenticating the user of the client.

13. The method of claim 12, further comprising, subsequent to the assigning the persistent cloud desktop to the user, receiving, by the client, an input indicative of a selection to launch the persistent cloud desktop, wherein the receiving the password request is responsive to the receiving the input indicative of the selection to launch the persistent cloud desktop.

14. The method of claim 7, further comprising responsive to the receiving the password by the client, causing the received password to be stored by the client.

15. The method of claim 1, further comprising:

subsequent to the client receiving the password for the cloud resource, receiving, by the gateway agent, a logon request from the client; and subsequent to the receiving the logon request, causing the password to be transmitting from the client to the cloud resource.

16. The method of claim 15, wherein the logon request includes the authentication token.

17. The method of claim 1, wherein the validating the password request includes comparing a user name included in the password to a user name assigned to the cloud resource.

18. The method of claim 1, further comprising creating, by the desktop agent, the password for the cloud resource subsequent to the validating the password request, wherein the created password is a cryptographically random password.

19. The method of claim 1, wherein the password request further includes a fully qualified domain name (FQDN) associated with the client, an internet protocol (IP) address associated with the client, a certificate hash, or any combination thereof.

20. A system comprising:

a control plane executed by a processor, the control plane configured to transmit an authorization token associated with a cloud resource to a client;

a desktop agent executed by a server, the desktop agent configured to:

receive a password request from the client including (i) the authorization token and (ii) an authentication token received by the client from an identity service provider, validate the password request based at least in part on the authentication token and the authorization token, and cause the client to receive a password for the cloud resource responsive to the validating the password request.

* * * * *